UNITED STATES PATENT OFFICE.

JAN RUEB, OF THE HAGUE, NETHERLANDS.

PROCESS FOR THE PRODUCTION OF TIN OR TIN COMPOUNDS FROM PYRITIC OR OTHER TIN ORES, TIN-ORE CONCENTRATES, TIN-WASTE, TIN-PLATE WASTE, STANNIFEROUS SLAG, TIN-SLAG, AND THE LIKE.

1,124,174. Specification of Letters Patent. Patented Jan. 5, 1915.

No Drawing. Application filed January 2, 1913. Serial No. 739,845.

*To all whom it may concern:*

Be it known that I, JAN RUEB, a subject of the Queen of the Netherlands, residing at No. 107 Laan Copes van Cattenburch, The Hague, Netherlands, have invented certain new and useful improved processes for the production of tin or tin compounds from pyritic or other tin ores, tin-ore concentrates, tin-waste, tin-plate waste, stanniferous slag, tin-slag, and the like, of which the following is a specification.

This invention has for its object to provide an improved process for the production of tin or tin compounds by direct melting to tin iron or tin copper matte of pyritic and other tin ores, tin ore concentrates, tin waste, tin plate waste, stanniferous slag, tin slag and the like, afterward treating the matter, roasted or not, with solution of alkalisulfids and winning the tin from these solutions according to known methods.

Heretofore the usual treatment of tin ores, other than those derived from alluvial deposits, has consisted in pulverizing the crude ore by machinery and then concentrating the tin by washing on tables or the like. The resulting concentrate was then subjected to reductions by coal and the metallic tin thus produced was subjected to a refining operation. In the case of pyritic ores the concentrating or reducing operations were mostly preceded by a roasting operation.

The above described process is attended by a loss of tin, which loss is increased considerably when the tin stone is contained in the ore in a state of very fine division and intimately connected with the pyrites of iron oxids (extra loss in concentration) or when the ore contains a great deal of stannite (loss in concentration and during the roasting). In the former case a large percentage of iron oxid also remains in the concentrate, thereby giving rise to great loss through the increased production of slag and of tin iron in the reduction.

For the complex stannite ores a special process is devised by which the tin first is driven into the slag and afterward obtained as a tin lead alloy. The results of this process also are not yet quite satisfactory.

Now according to the present invention the tin or the like is smelted directly to tin iron or tin copper matte which is more suited for further treatment than the crude ore, the tin being present in the matte in a soluble form namely as tin sulfid. In the smelting operation pyrites and suitable slagging materials may be added to the charge according to requirement, as for example, when tin waste or tin plate waste is to be smelted.

By the term tin iron matte or tin copper matte is meant more particularly a mixture of metallic sulfids or combinations of these in which tin sulfid, iron sulfid and copper sulfid by virtue of their value or quantity are to be considered as the main constituents although the matte may contain arsenic, lead silver or other substances.

The loss occurring in the concentration of the crude tin ore, which may amount to 40 per cent., is obviated by this direct smelting. Direct smelting also obviates the loss that occurs in the reduction owing to the formation of tin irons and the inclosing of metallic tin in the slag because no tin iron or metallic tin is formed in the improved process. The percentage of chemically combined tin or of tin inclosed in the form of tin iron matte, contained in the slag is also smaller than that contained in the slag produced in the reduction of tin ore by charcoal. The improved process is thus applicable with advantage for the treatment of tin slag produced in the usual smelting of alluvial ores.

Tin waste and tin plate waste may also be treated by the improved process for the recovery of metallic tin. The tin iron matte may be treated to produce a solution of alkalisulfo stannate which can be electrolyzed by known processes the direct production of pure tin without its needing further refining obviating refining costs, simply by leaching with solutions of alkali sulfids.

If tin copper matte is to be treated it may be profitable before leaching to roast the matte and leach out the copper before leaching for tin.

What I claim is:

1. The process for the production of tin compounds from materials containing tin mainly in an oxidized condition, which consists in smelting said materials with a heavy metal sulfid and with slag forming substances so as to convert such tin compounds into tin-iron matte.

2. The process for the production of tin compounds from materials containing tin mainly in an oxidized condition, which consists in smelting said materials with a heavy metal sulfid and with slag forming substances, so as to convert such tin compounds into tin-iron matte, thereafter leaching, without first sintering or fusing the said tin-iron matte, with solutions of alkali polysulfids; and recovering the tin in metallic form from the resulting compound.

In testimony whereof I have hereunto set my hand in presence of two subscribing witnesses.

JAN RUEB.

Witnesses:
THOMAS D. VERHAVE,
A. HILDERBERG.